United States Patent
Kranz et al.

(10) Patent No.: US 9,133,904 B2
(45) Date of Patent: Sep. 15, 2015

(54) TORSIONAL VIBRATION DAMPER

(75) Inventors: Andreas Kranz, Stolberg (DE);
Dietmar Heidingsfeld, Aachen (DE);
Dietmar Ritterbecks, Waldfeucht (DE);
Stefan Peters, Aachen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 15 days.

(21) Appl. No.: 14/115,254

(22) PCT Filed: Mar. 27, 2012

(86) PCT No.: PCT/EP2012/055377
§ 371 (c)(1),
(2), (4) Date: Nov. 1, 2013

(87) PCT Pub. No.: WO2012/150093
PCT Pub. Date: Nov. 8, 2012

(65) Prior Publication Data
US 2014/0076100 A1    Mar. 20, 2014

(30) Foreign Application Priority Data
May 3, 2011 (DE) .................. 10 2011 075 114

(51) Int. Cl.
F16F 15/12 (2006.01)
F16F 15/121 (2006.01)
F16F 15/131 (2006.01)
F16F 15/134 (2006.01)

(52) U.S. Cl.
CPC ............ *F16F 15/121* (2013.01); *F16F 15/131* (2013.01); *F16F 15/13438* (2013.01); *F16F 15/13453* (2013.01); *Y10T 74/2131* (2015.01)

(58) Field of Classification Search
USPC ......... 74/572.2, 573.13, 574.4; 181/208, 209; 464/51, 61.1, 67.1, 68.92; 267/277, 267/287; 192/205
See application file for complete search history.

(56) References Cited

U.S. PATENT DOCUMENTS

| 5,064,042 A    * | 11/1991 | Kuhne et al. .................. 192/205 |
| 2002/0094874 A1* | 7/2002  | Uehara et al. ................... 464/68 |
| 2008/0119293 A1  | 5/2008  | Rohs et al. |
| 2012/0028722 A1* | 2/2012  | Boelling ...................... 464/68.1 |

FOREIGN PATENT DOCUMENTS

| DE | 198 10 500 A1 | 10/1998 |
| DE | 199 24 213 A1 | 11/2000 |

(Continued)

*Primary Examiner* — Vicky Johnson
(74) *Attorney, Agent, or Firm* — Cozen O'Connor (57) ABSTRACT

A torsional vibration damper has a drive-side transmission element; a damping device having a plurality of energy accumulators; a driven-side transmission element configured to be rotationally deflected coaxial to the drive-side transmission element and which is connected to the drive-side transmission element via the damping device; and sliding elements arranged in one of the drive-side transmission element and driven-side transmission element so as to be movable in a circumferential direction. The sliding elements have: (i) circumferential projections for the energy accumulators, these circumferential projections being directed toward adjacent sliding elements, and/or (ii) penetration spaces for circumferential projections provided at the adjacent sliding element. The energy accumulators are supported at the sliding elements, the sliding elements having in sequence in an axial direction at least one circumferential projection and/or at least one penetration space at their circumferential side which faces a sliding element adjacent in the circumferential direction.

12 Claims, 6 Drawing Sheets

(56) References Cited

FOREIGN PATENT DOCUMENTS

| DE | 10 2004 006 879 | 8/2004 |
| DE | 10 2005 052 170 | 6/2006 |
| DE | 10 2006 030136 A1 | 1/2007 |
| WO | WO 2010/032915 | 3/2010 |

* cited by examiner

TORSIONAL VIBRATION DAMPER

CROSS-REFERENCE TO RELATED APPLICATIONS

This is a U.S. national stage of application No. PCT/EP2012/055377, filed on 27 Mar. 2012, which claims priority to the German Application No.: 10 2011 075 114.9, filed 3 May 2011, the content of both incorporated herein by reference.

BACKGROUND OF THE INVENTION

1. Field of the Invention

The invention is directed to a torsional vibration damper with a drive-side transmission element and with a driven-side transmission element, which can be rotationally deflected coaxial to the drive-side transmission element and which is connected to the latter via a damping device which is provided with energy accumulators. These energy accumulators are supported at sliding elements arranged in one of the transmission elements so as to be movable in a circumferential direction and which have circumferential projections for the energy accumulators, the circumferential projections being directed toward adjacent sliding elements, and/or which have penetration spaces for circumferential projections provided at the adjacent sliding elements. The sliding elements have in sequence in an axial direction at least one circumferential projection and/or at least one penetration space at their circumferential side which faces a sliding element adjacent in the circumferential direction.

2. Related Art

A known torsional vibration damper is shown in WO 2010/032915 A1. This torsional vibration damper has sliding elements at which are provided, at the center in each instance, a circumferential projection projecting in a direction of the sliding element adjacent in the circumferential direction or a penetration space for a circumferential projection formed at the adjacent sliding element. The following functions may be assigned to the circumferential projections: first, the circumferential projections overlap the energy accumulators along a portion of the circumferential extension thereof and accordingly prevent a bulging of the energy accumulators induced by centrifugal force, especially when these energy accumulators are formed as torsion springs with coils; second, the circumferential projections can be dimensioned such that, in conjunction with the associated penetration space of the sliding element adjacent in circumferential direction, they limit a compression travel of the energy accumulators under load so as to prevent the coils from mutually contacting. By preventing bulging of the energy accumulators, individual coils are prevented from frictionally contacting or even digging into one another in a radially outer limit of the torsional vibration damper, which would appreciably impair the decoupling effect. Limiting the compression travel of the energy accumulators counteracts high torsional stresses in the spring coils and therefore guards against damage to, or even breakage of, spring coils.

In the known torsional vibration damper, the circumferential projections are able to support the coils of energy accumulators radially outwardly within the extension region of the circumferential projections. However, this function is not possible adjacent a circumferential projection in the circumferential direction, i.e., in the extension region of a penetration space, while the respective circumferential projection has not penetrated into the penetration space when the energy accumulators are not loaded or under limited load. Consequently, the respective energy accumulator is only supported on the circumferential side on which the circumferential projection is located. Further, in the case of sliding elements having the circumferential projection on one circumferential side and the penetration space on the opposite circumferential side, there is a risk during assembly that they may be inserted with the sides reversed and be unable to function.

SUMMARY OF THE INVENTION

It is the object of the invention to form sliding elements at a damping device of a torsional vibration damper in such a way that they prevent bulging induced by centrifugal force even when energy accumulators are not loaded and are therefore expanded and, in addition, facilitate error-free assembly.

In accordance with one aspect of the invention, this object is met by a torsional vibration damper with a drive-side transmission element and with a driven-side transmission element, which can be rotationally deflected coaxial to the drive-side transmission element and which is connected to the latter via a damping device provided with energy accumulators. The energy accumulators are supported at sliding elements arranged in one of the transmission elements so as to be movable in circumferential direction and which have circumferential projections for the energy accumulators, these circumferential projections being directed toward adjacent sliding elements, and/or which have penetration spaces for circumferential projections provided at the adjacent sliding elements. The sliding elements have in sequence in an axial direction at least one circumferential projection and/or at least one penetration space at their circumferential side which faces a sliding element adjacent a in circumferential direction, and the sequential arrangement of the at least one circumferential projection and of the at least one penetration space at the sliding element in axial direction is determined by asymmetry with respect to an axially central plane. Sliding elements adjacent in circumferential direction are likewise provided with at least one circumferential projection and with at least one penetration space, but in reverse sequence relative to the first-mentioned sliding element.

Because of the asymmetry of the sliding elements with respect to an axially central plane, the provided circumferential projections are distributed in at least two axial planes that are offset with respect to one another, which substantially enlarges the supported circumferential extension of the respective energy accumulator. Accordingly, at least one circumferential projection can be provided at each sliding element for each circumferential direction in which there follows an adjacent sliding element so that each energy accumulator is acted upon from both ends thereof by circumferential projections and is accordingly radially supported from both sides. Owing to the fact that these circumferential projections are arranged on axial planes, which are offset with respect to one another, they do not make circumferential contact with one another in spite of their supporting effect with respect to the energy accumulators, which circumferential contact would cause a limiting of the compression travel of the energy accumulators. Instead, a penetration space provided at the mutually adjacent sliding elements is associated with each circumferential projection so that only these penetration spaces can come into circumferential contact with the respective circumferential projection and, therefore, also only these penetration spaces can cause a limiting of the compression travel in cooperation with the respective circumferential projection. This achieves the advantage that the energy accumulators are supported on both sides along a substantial circumferential extension by circumferential projections without any disadvantages.

Those sliding elements that are arranged between every two energy accumulators in circumferential direction preferably have at least one support and at least one penetration space at both circumferential sides in each instance. The at least one support and the at least one penetration space are provided on a circumferential side of the sliding element in a predetermined sequence in an axial direction of the sliding element and asymmetrically with respect to an axially central plane, while the at least one support and the at least one penetration space are provided on the opposite circumferential side of the sliding element in the reverse sequence in the axial direction of the sliding element and asymmetrically with respect to an axially central plane. By configuring the sliding elements in this way, the provided circumferential projections are deliberately divided between at least two mutually offset axial planes.

The circumferential projections are divided particularly uniformly between at least two mutually offset axial planes when those sliding elements that are arranged between every two energy accumulators in circumferential direction are formed in an inversely symmetrical manner with respect to an axially central plane so that a sliding element of this kind on a first circumferential side on a first axial side of the axially central plane has a first axial region with at least one support or at least one penetration space, whereas a second axial region is provided in each instance at the same circumferential side but on a second axial side of the axially central plane as well as on an opposite second circumferential side but on the first axial side of the axially central plane, in which second axial region there is associated with every at least one circumferential projection provided in the first axial region in each instance at least one penetration space that is provided at the comparable location of the respective second axial region. Also, there is associated with every at least one penetration space provided in the first axial region in each instance at least one circumferential projection, which is provided at the comparable location of the respective second axial region. When the sliding elements are formed in this manner, they can be inserted into the damping device of the respective torsional vibration damper during assembly in two rotational positions that diverge from one another by 180° without having a disadvantageous effect on the functioning of the sliding elements. This facilitates assembly, on one hand, and reduces the risk of an incorrect insertion into the damping device, on the other hand.

The above configuration ensures that the circumferential projections penetrate smoothly into the associated penetration spaces in that the respective circumferential projection narrows axially from its engagement region at the circumference-side central region of the respective sliding element in the circumferential direction to its circumference-side free end, while the respective penetration space narrows axially from its circumference-side penetration region in the circumferential direction to its circumference-side end region at the central region of the respective sliding element.

Owing to the fact that the penetration space is shaped so as to open in the radial direction, a possible skewing of the individual sliding element with a component in radial direction relative to the sliding element adjacent in circumferential direction has no disadvantageous effects and the circumferential projection can penetrate into the associated penetration space without friction and without impact effects. Alternatively, a radial space limitation can be associated with the penetration space, which radial space limitation at least substantially faces a radial space limitation at the associated circumferential projection.

The sliding elements are bounded radially outwardly in each instance by a sliding surface, which can be guided along a guide path and radially inwardly in each instance by a base. The base can be provided with circumferential projections directed to adjacent sliding elements and/or penetration spaces for circumferential projections provided at the adjacent sliding element, and on the circumferential side of the sliding elements which faces a sliding element that is adjacent in circumferential direction the sliding elements have in sequence in axial direction at least one circumferential projection and at least one penetration space, and the sequential arrangement of the at least one circumferential projection and of the at least one penetration space at the sliding element in axial direction is determined by asymmetry with respect to an axially central plane. Sliding elements, which are adjacent in circumferential direction, are then likewise provided with at least one circumferential projection and with at least one penetration space but in reverse sequence with respect to the first-mentioned sliding element. This means that those sliding elements which are arranged between every two energy accumulators in the circumferential direction have in each instance at both circumferential sides of their base at least one circumferential projection and at least one penetration space, and the at least one circumferential projection and the at least one penetration space are provided at a circumferential side of the sliding element in a predetermined sequence in the axial direction of the sliding element and asymmetrically with respect to an axially central plane, while the at least one circumferential projection and the at least one penetration space are provided at the opposite circumferential side of the sliding element in reverse sequence in the axial direction of the sliding element and asymmetrically with respect to the axially central plane. In a particularly advantageous embodiment, the respective sliding element has at its base an inversely symmetrical configuration relative to the sliding surface bounding the sliding element radially outwardly in that the base has a penetration space at that location where the sliding surface has a circumferential projection and has a circumferential projection at that location where the sliding surface has a penetration space. It can be advantageous to form the base in this way when the base is intended to limit the compression travel of the energy accumulators between the sliding elements and the circumferential projections at the sliding elements serve only for centrifugal force-related support of coils of the energy accumulators.

In another aspect, in the extension region surrounded by principal energy accumulators, the sliding elements can have in each instance at least one pin, which has at least one circumferential shoulder and at least one penetration space in predetermined sequence with respect to an axially central virtual plane, and sliding elements adjacent in circumferential direction are likewise formed in each case with at least one pin, which is likewise provided with at least one circumferential projection, and with at least one penetration space but in reverse sequence relative to the at least one pin of the first-mentioned sliding element. When there are radially inner energy accumulators which are radially surrounded in each instance by the principal energy accumulators, coils of these radially inner energy accumulators engage around these pins. Accordingly, the sliding elements are especially suited for the use of energy accumulators which are arranged radially one inside the other, but can also be used when only the principal energy accumulators are provided at least for some of the sliding elements.

BRIEF DESCRIPTION OF DRAWINGS

The invention will be described more fully in the following with reference to the drawings. In the drawings.

DETAILED DESCRIPTION OF THE PRESENTLY PREFERRED EMBODIMENTS

Figure 1:
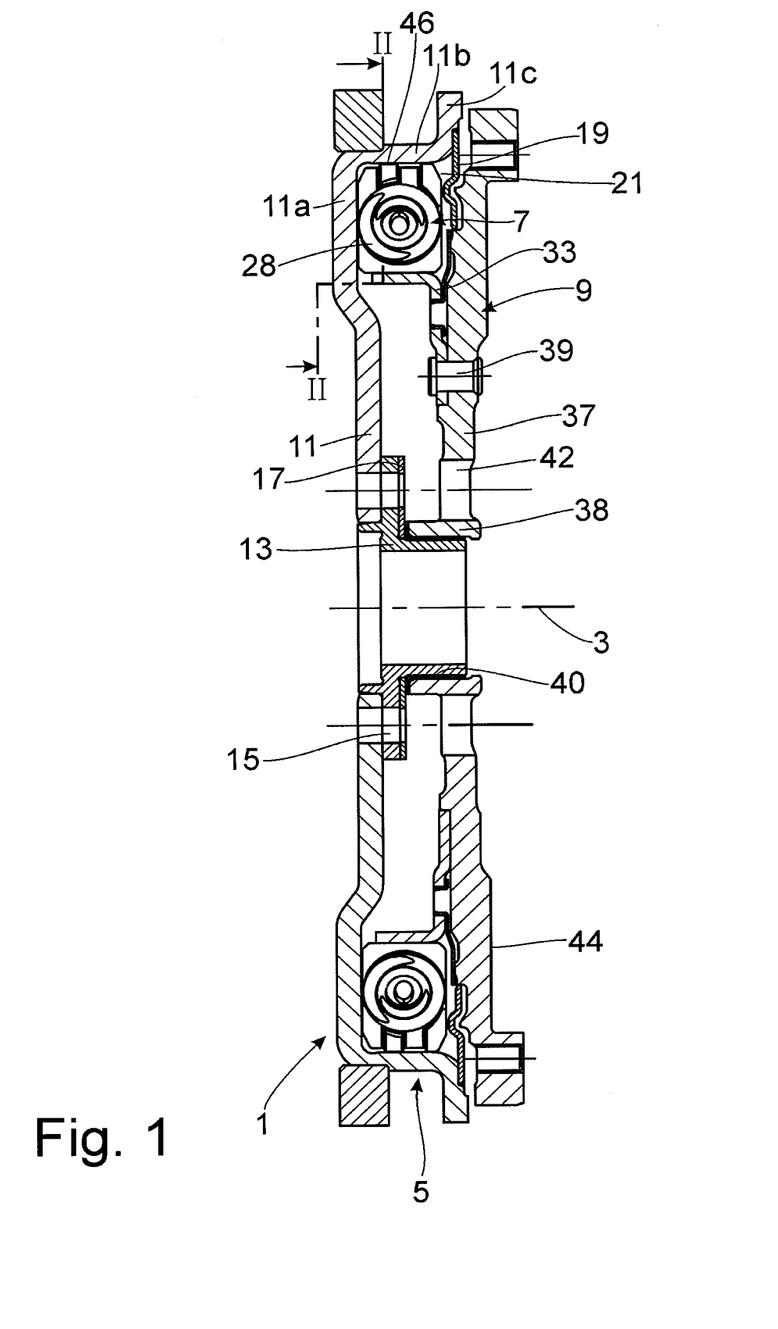
FIG. 1 is a radial section through a torsional vibration damper with a damping device which has sliding elements according to the invention for energy accumulators.

FIG. 1 shows a torsional vibration damper 1, which is arranged so as to be rotatable around an axis 3. The torsional vibration damper 1 has a drive-side transmission element 5, which is operatively connected to a driven-side transmission element 9 by means of a damping device 7.

The drive-side transmission element 5 has a primary flange 11, which is connected to a primary hub 13. The primary hub 13 can be fastened to the primary flange 11 by fastening elements, e.g., rivets, not shown. The primary flange 11 and primary hub 13 can be fixedly connected to a crankshaft of an internal combustion engine by means of fastening elements such as screws, also not shown, so that the drive-side transmission element 5 is connected to the crankshaft such that it is fixed with respect to rotation relative to it. The screws mentioned above penetrate the passages 15 shown in FIG. 1 and can be supported by their screw heads at thrust washers 17 which can have a greater strength than primary flange 11 and primary hub 13.

Starting from the primary hub 13, the primary flange 11 extends initially substantially in radial direction in a first radial portion 11a and then, in an axial portion 11b, curves in an at least substantially axial extension direction in the radial outer region. Finally, the primary flange 11 again turns radially outward in a second radial portion 11c and receives a fixed seal 19 at this radial portion 11c. The first radial portion 11a, like the seal 19, serves to axially limit a damper space 21, while the axial portion 11b serves to limit the damper space 21 radially outwardly and has at its radially inner side a guide path 46 for sliding elements 25, 30 and 35, visible, for example in FIG. 2, of the damping device 7. The damper space 21, which is provided for receiving the damping device 7, can be filled with viscous medium.

Figure 2:
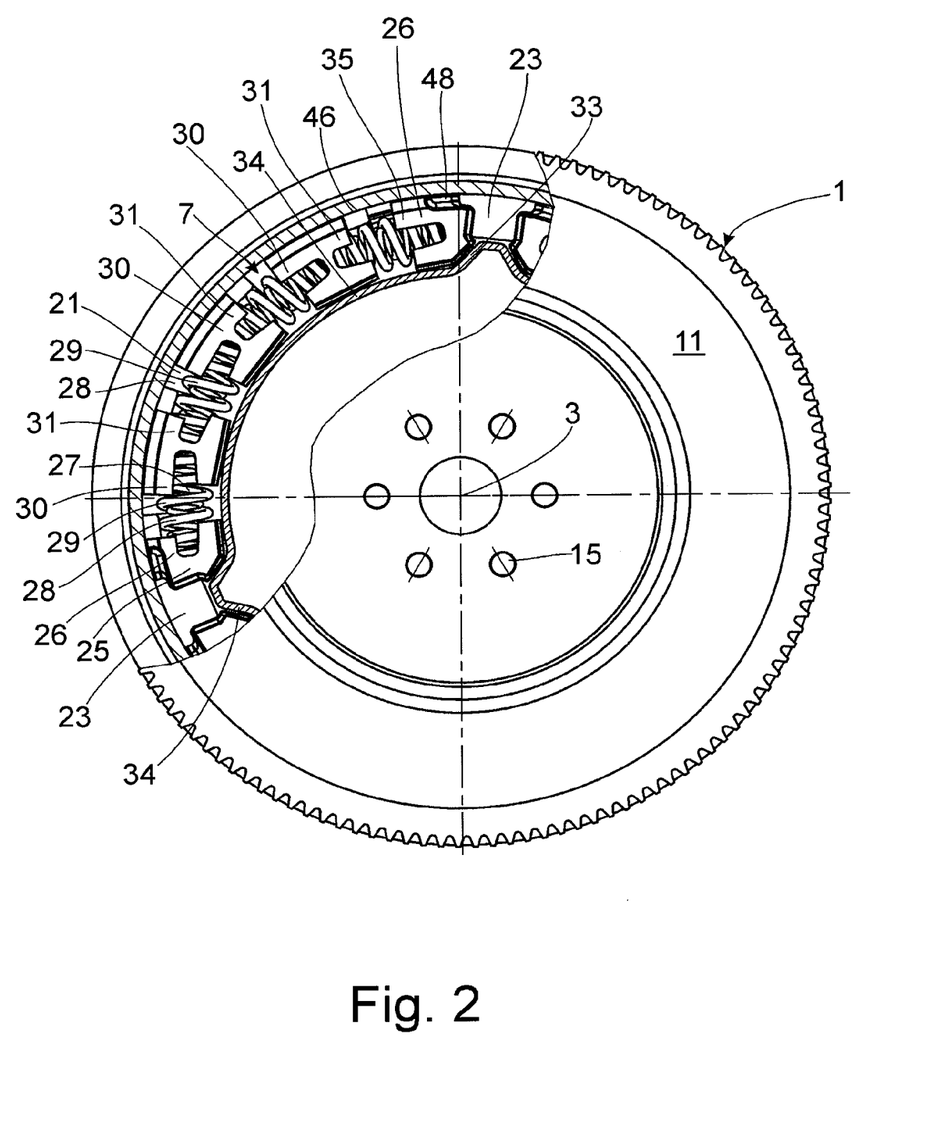
FIG. 2 is a top view of the torsional vibration damper according to section line II-II in FIG. 1.

Drive-side control elements for the damping device 7 are provided at the side of the first radial portion 11a facing the damping device 7, at the radial inner side of the guide path 46, and possibly also at the side of the seal 19 facing the damping device 7. Control elements of this kind, designated by reference numeral 23, are shown in FIG. 2. They act on a circumferentially first sliding element 25, which is formed as a spring cap 26. This sliding element 25 operatively communicates with an adjacent sliding element 30, which is located intermediately in a circumferential direction and which is constructed as a spring shoe 31, via a first energy accumulator 28, which is formed as a coil spring 27 having a plurality of coils 29. Following in the circumferential direction are further circumferentially intermediate sliding elements 30, which are constructed in each instance as a spring shoe 31 and operatively connected by means of an energy accumulator 28, constructed in the manner described above, to the subsequent circumferentially intermediate sliding element 30, followed by the circumferentially last sliding element 35, which, like the circumferentially first sliding element 25, is constructed as a spring cap 26. The energy accumulators 28 can preferably vary from one another with respect to stiffness. The circumferentially last sliding element 35 cooperates with a driven-side control element 33, which is formed integral with a ring 34. Owing to its wedge-shaped construction, the driven-side control element 33, by interacting with the circumferentially last sliding element 35, causes a movement toward the latter. The ring 34 receiving the driven-side control element 33 is fastened, e.g., by rivet 39, to a flywheel mass 37 of the driven-side transmission element 9.

The aforementioned control sequence of the sliding elements 25, 30 and 35 is relevant in a first deflection direction of the drive-side transmission element 5 relative to the driven-side transmission element 9, for example, under tensile load. In the opposite deflecting direction, i.e., under compressive load, the control sequence is reversed.

Like the sliding elements 25, 30 and 35 and the energy accumulators 28, the control elements 23 and 33 are also part of the damping device 7. As is indicated in FIG. 2, three damping devices 7 of this kind are arranged parallel to one another on the circumference of the torsional vibration damper. However, a different quantity of damping devices 7 can also be realized along the circumference.

Before addressing details of the construction and functioning of the damping device 7, it should be noted that the driven-side transmission element 9 has, at its flywheel, mass 37 in the radially inner region a secondary hub 38 (FIG. 1) which is centered on the primary hub 13 of the drive-side transmission element 5 and axially positioned in direction of the crankshaft by means of a bearing 40 formed by a thrust bearing/journal bearing combination. Directly radially outside of the bearing 40, the flywheel mass 37 has apertures 42, which allow access, at least for assembly tools, to the fastening elements for connecting the drive-side transmission element 5 to the crankshaft. Further, at its side remote of the damping device 7, the flywheel mass 37 has a contact surface 44 for a friction lining of a clutch disk, not shown, which is part of a shiftable friction clutch so that, depending on the gear selection of the friction clutch, torque transmitted by the crankshaft can either be transmitted to a driven-side transmission input shaft or this transmission can be interrupted.

In the disclosed embodiment, steps are undertaken to reduce friction in order to ensure a high decoupling quality of the damping device 7 between the two transmission elements 5 and 9. For example, at least some of the drive-side control elements 23 are formed with circumferential projections 48 on both sides in the circumferential direction, which circumferential projections 48 engage radially between the guide path 46 and the respective associated sliding element 25 or 35 and accordingly at least support a friction-reducing lifting of the sliding elements 25 or 35 from the guide path 46.

Figures 3, 4, 5:
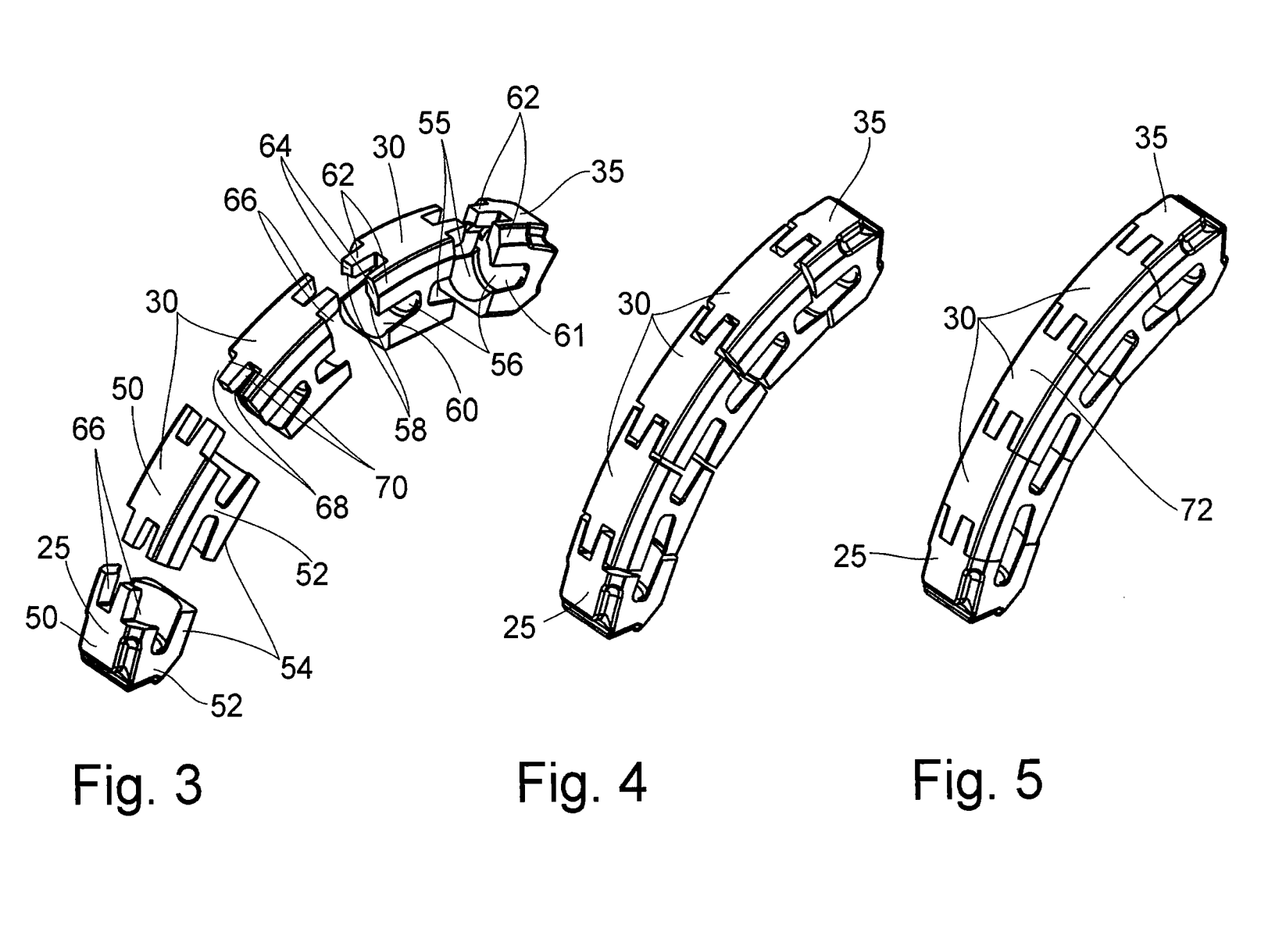
FIG. 3 is a detail of the sliding elements shown in FIG. 1 or 2 in the relative position with respect to one another that results when the energy accumulators are at least partially expanded.
FIG. 4 shows the sliding elements as in FIG. 3 showing a relative position of the sliding elements shortly before the end stop position is reached.
FIG. 5 shows the sliding elements as in FIG. 4 with the end stop position having been reached.
Figure 12:
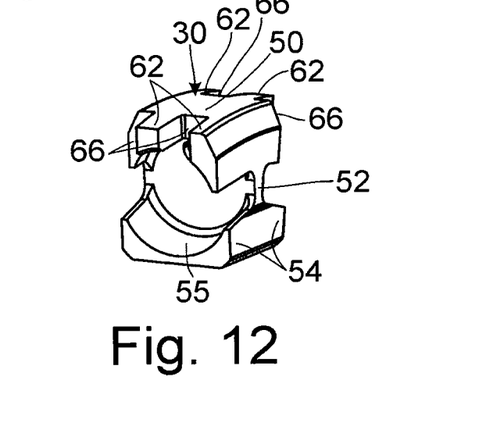
FIG. 12 is a sliding element according to FIGS. 3 to 5.

FIGS. 3 to 5 show detailed views of sliding elements 25, 30 and 35 of one of the three damping devices 7 connected in parallel, for example, the sliding elements 25, 30 and 35 according to the depiction in FIG. 2. For the sake of clarity, the energy accumulators 28 are not shown. In FIG. 3, the sliding elements 25, 30 and 35 occupy a relative position with respect to one another that is brought about when the energy accumulators are not loaded or are only slightly loaded and in which the individual sliding elements 25, 30 and 35 are spaced apart in circumferential direction. FIG. 4 shows a relative position of the sliding elements 25, 30 and 35 under high load, while FIG. 5 shows the sliding elements 25, 30 and 35 at peak load or overload. One of the sliding elements 30 located in an intermediate position in the circumferential direction, i.e., between sliding elements 25 and 35, is shown in an enlarged detail in FIG. 12.

As is clearly shown in FIG. 3, the sliding elements 25, 30 and 35 have a special design which will be described more fully in the following. Extending radially inside of sliding surfaces 50, which are provided for contact with the guide path 46, is a radial web 52 whose radially inner end passes into circumferential shoulders 54 of a base 55. At the sides of the radial web 52 that are directed toward a circumferentially adjacent sliding element 25, 30, the radial web 52 is provided in each instance with a disk-shaped cutout 56 which serves to receive a circumference-side end of an energy accumulator 28. The sliding surfaces 50 and the circumferential shoulders 54 are also each provided with formations 58, 60 formed at the outer contour of the energy accumulators 28. This results in a chamber 61 for receiving the energy accumulators 28.

At their sides facing the sliding elements 25, 30 and 35, which are adjacent to one another in circumferential direction, the sliding surfaces 50 of the sliding elements 25, 30 and 35 open into circumferential projections 62 which project beyond the respective sliding surface 50 in the circumferential direction. The circumferential projections 62 narrow axially preferably in direction of their circumference-side free ends 64. A penetration space 66, which narrows preferably axially in the circumferential direction from a circumference-side penetration region 68 to its circumference-side end region 70 adjoining the sliding surface 50, is associated with each of these circumferential projections 62 at circumferentially adjacent sliding elements 25, 30 and 35.

As is shown in FIGS. 4 and 5, with increasing compression travel of the energy accumulators 28 located between the sliding elements 25, 30 and 35, the circumferential projections 62 penetrate increasingly into the respective associated penetration space 66 of the sliding elements 25, 30 and 35, which are adjacent in circumferential direction. FIG. 4 shows the relative position of sliding elements 25, 30, 35 when the energy accumulators 28 are extensively compressed, while FIG. 5 shows sliding elements 25, 30, 35 when energy accumulators 28 are compressed to the extent that the sliding elements 25, 30 and 35 come into contact with one another and accordingly permit no further compression travel at the energy accumulators 28, even if the transmitted load should increase further. The sliding elements 25, 30 and 35 accordingly form compression travel limiting means 72 for the energy accumulators 28. In this respect, it does not matter whether the compression travel limiting means 72 are formed by the circumferential projections 62 in combination with the respective associated penetration space 66 or by the circumferential shoulders 54 at the radially inner ends of the radial webs 52. In the former instance, the circumferential projections 62 are provided for a dual function in that they provide for a radial support of coils 29 of the energy accumulators 28 against deflections induced by centrifugal force and also for limiting the compression travel of the energy accumulators 28, whereas in the other instance there is a division of functions spatially and with respect to component parts in that the circumferential projections 62 are provided solely for radial support of coils 29 of the spring accumulators 28, while the circumferential shoulders 54 ensure limiting of the compression travel of the energy accumulators 28.

Figure 6:
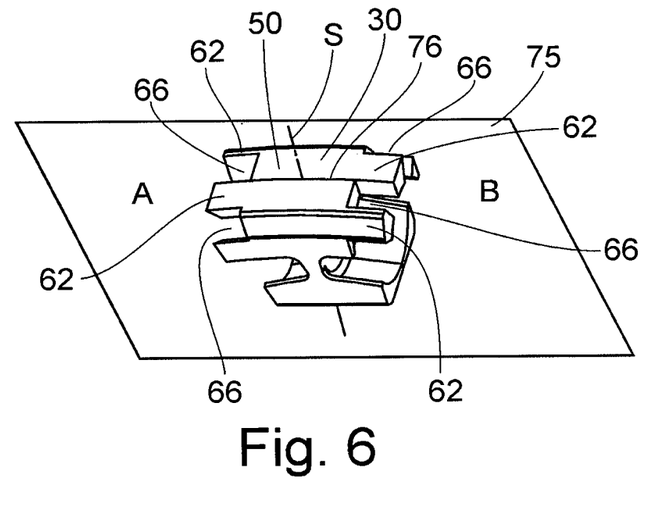
FIG. 6 is a detail of an individual sliding element with an axially central virtual plane.
Figure 7:
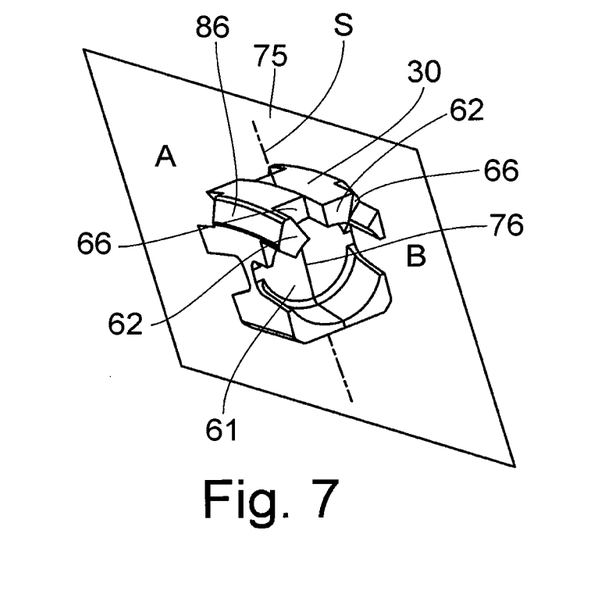
FIG. 7 shows the individual sliding element as in FIG. 6 seen from another perspective.

As can be seen from FIGS. 3 to 5, the circumferential projections 62 and penetration spaces 66 are arranged next to one another in predetermined sequence viewed in the axial direction. In so doing, as is shown in FIG. 6 or 7, the sequential arrangement of circumferential projections 62 and penetration spaces 66 at each of the sliding elements 25, 30 and 35 is determined in the axial direction by asymmetry with respect to a virtual axially central plane 75. As is shown by FIGS. 6 and 7, the axially central plane 75 extends along a likewise virtual dividing line 76 drawn through the sliding element 30. It is also pertinent to the following considerations to mention an axis S shown in FIGS. 6 and 7, which extends in the axially central plane 75 through the center of the sliding element 30 in circumferential direction.

Looking more closely at the sequential arrangement of circumferential projections 62 and penetration spaces 66 in the axial direction that is shown in FIG. 6 or FIG. 7, it will be seen that directly in front of the axially central plane 75 on the circumferential side A of axis S, the sliding element 30 has a circumferential projection 62, which is adjoined at increasing distance from the axially central plane 75 by a penetration space 66. Directly behind the axially central plane 75, the above-mentioned circumferential projection 62 is followed on the circumferential side A of axis S by another penetration space 66, which is adjoined at increasing distance from the axially central plane 75 by another circumferential projection 62. Thus on circumferential side A of axis S the sequential arrangement is characterized by a penetration space 66 alternating with every two circumferential projections 62. There is a corresponding, but inversely symmetrical, sequential arrangement 66 on the circumferential side B of axis S so that directly in front of the axially central plane 75 the sliding element 30 has a penetration space 66 that is adjoined at increasing distance from the axially central plane 75 by a circumferential projection 62. Directly behind the axially central plane 75, the above-mentioned penetration space 66 is followed by a circumferential projection 62, which is adjoined by another penetration space 66.

The inversely symmetrical configuration of the sliding element 30 is particularly advantageous because the sliding element can be installed in a torsional vibration damper in the illustrated position as well as in a position that is rotated by 180° around axis S. It is essential only that the sliding element 25, 30, 35 that is adjacent in circumferential direction be provided with the corresponding sequential arrangement of circumferential projection 62 and penetration space 66. By corresponding sequential arrangement is meant that the sliding element 25, 30, 35 following on circumferential side A of axis S is shaped like the depicted sliding element 30 on the circumferential side B of axis S so that each circumferential projection 62 of the depicted sliding element 30 can penetrate into an associated penetration space of the adjacent sliding element 25, 30, 35 and, conversely, an associated penetration space 66 of the depicted sliding element 30 is allocated to each circumferential projection of the adjacent sliding element 25, 30, 35.

Although, as has already been stated, an inversely symmetrical configuration of the sliding element 30 is advantageous, a configuration of this kind can, of course, also be omitted and a sequential arrangement of circumferential projections 62 and penetration spaces 66 on the circumferential side B of axis S can be selected so as to be identical to that on the circumferential side A or so as to provide a sequence of circumferential projections 62 and penetration spaces 66 that is entirely different from that on the circumferential side A. In this regard, it need only be ensured that the sliding element 25, 30, 35 adjacent to the circumferential side A of sliding element 30 is shaped in conformity with the circumferential side A of sliding element 30 and that the sliding element 25, 30, 35 adjacent to the circumferential side B of sliding element 30 is shaped in conformity with the circumferential side B of sliding element 30 so that each circumferential projection 62 of the depicted sliding element 30 can penetrate into an associated penetration space of the adjacent sliding element 25, 30 or 35, and also so that each circumferential projection of the adjacent sliding element 25, 30 or 35 can penetrate in an associated penetration space 66 of the depicted sliding element 30.

Figure 10:
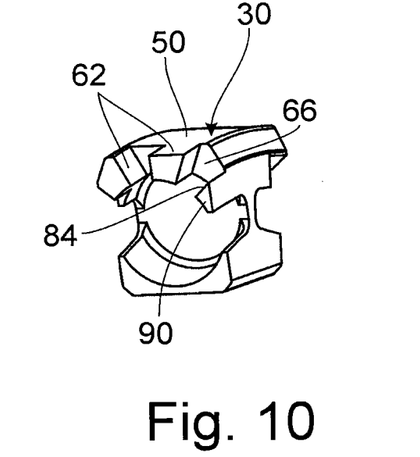
FIG. 10 is a sliding element according to FIGS. 6 and 7.

In the embodiment of the sliding element 30 shown in FIG. 6 or 7 and also in FIG. 10, two circumferential projections 62 project in the circumferential direction beyond sliding surface 50 on the circumferential side A of axis S as well as on the circumferential side B of axis S. As was already mentioned, each of these circumferential projections 62 forms a radial support for coils 29 of the energy accumulators 28 against displacement induced by centrifugal force. By dividing the circumferential projections 62 between two axial planes for each circumferential side of the sliding element 30 and by combining these circumferential projections 62 with corresponding penetration spaces 66, the selected supported circumferential extension of the respective energy accumulator 28 received between two sliding elements 25, 30, 35 can be very large without limiting the compression travel of the energy accumulators 28 more than is necessary as regards the durability of the energy accumulators 28.

Figure 8:
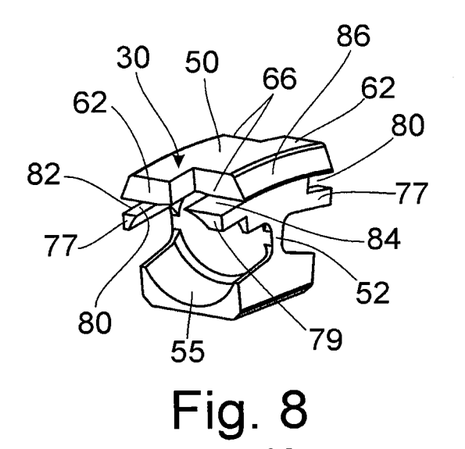
FIG. 8 is a sliding element with a design diverging from that of the sliding elements according to FIGS. 3 to 5 or FIGS. 6 and 7.
Figure 9:
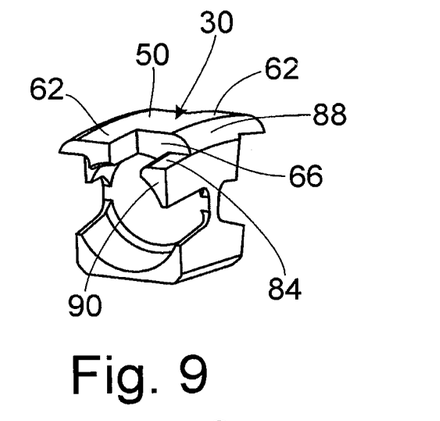
FIG. 9 is a sliding element as in FIG. 8 but with another design.
Figure 11:
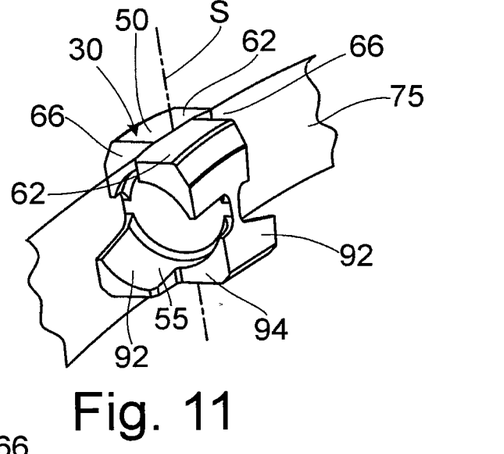
FIG. 11 is a sliding element as in FIG. 8 but with yet another design.

Alternative embodiments of the sliding element 30 shown in FIGS. 3 to 5 and 12 or the sliding element 30 shown in FIGS. 6, 7 and 10 are shown in FIGS. 8, 9 and 11.

FIG. 8 shows a sliding element 30 with only one circumferential projection 62 and one penetration space 66 per circumferential side in a determined circumferential direction. Circumferential protuberances 77, 79 are provided on the radially inner side of the radial region in which the circumferential projection 62 and penetration space 66 are situated. Between the first circumferential protuberances 77, which are associated in each instance with a circumferential projection 62, and the respective circumferential projection 62 there remains a radial space 80 into which one of the second circumferential protuberances 79 can penetrate at a sliding element 25, 30, 35 adjacent in the circumferential direction when approaching the illustrated sliding element 30. To ensure this function, the second circumferential protuberances 79 are formed directly radially inward of a respective penetration space 66 but remain radially outside of the respective associated first circumferential protuberance 77 that adjoins the radial web 52 radially outwardly in each instance. The first circumferential protuberances 77 form space limiting means 82 in each instance for the second circumferential protuberances 79, which in turn form radial space limiting means 84 for the circumferential projections 62.

In FIGS. 3 to 8 and 10 to 12, the sliding elements 30 have in each case a slope 86 at the axial end regions of the sliding surfaces 50 and of the circumferential projections 62. In FIG. 9, a rounded portion 88 is provided at these locations instead. In other respects, the sliding element 30 according to FIG. 9 also has circumferential protuberances 90 which directly adjoin an associated penetration space 66 starting from the radially inner side and accordingly serve as radial space limiting means 84 for the respective associated circumferential projections 62. These circumferential protuberances 90, serving as radial space limiting means 84 for the circumferential projections 62, are also provided in the sliding element 30 according to FIG. 10 but in this case with a diagonal orientation with respect to the sliding surface 50.

In the sliding elements 30 according to FIGS. 3 to 10 and FIG. 12, the base 55 is shaped symmetrically relative to the radial webs 52 in the circumferential direction starting from point S (FIG. 6 or 7). In contrast, FIG. 11 shows a sliding element 30 in which a circumferential projection 92 and a penetration space 94 are associated with the base 55 at each circumferential side of a point S. As with the sliding surface 50, the base 55 is also shaped inversely symmetrically starting from an axially central plane 75. The shape of the sliding surface 50 and base 55 is likewise inversely symmetrical in that the sliding surface 50 has a penetration space 66 at the location where the base 55 has a circumferential projection 92 and has a circumferential projection 62 at the location where the base 55 has a penetration space 94.

Figure 13:
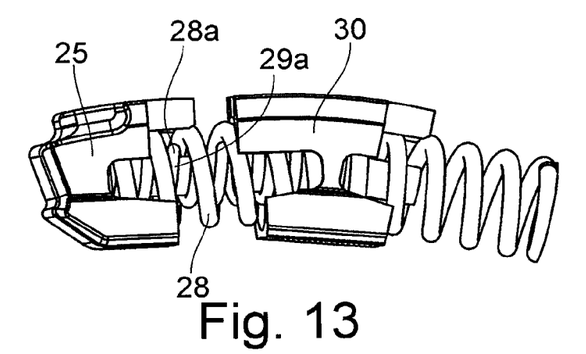
FIG. 13 are sliding elements according to FIG. 3, but with pins for additional energy accumulators radially inward of a principal energy accumulator.
Figure 14:
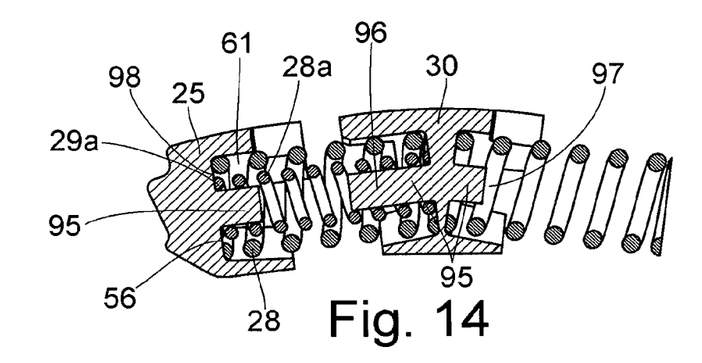
FIG. 14 are the sliding elements as in FIG. 13, but in a sectional diagram.

If not only one energy accumulator, that is, the principal energy accumulator 28, acts between every two sliding elements 25, 30 and 35 but rather, as is shown in FIGS. 13 and 14 between sliding elements 25 and 30, at least one radially inner energy accumulator 28a, which is arranged radially inside of the principal energy accumulator 28 and which is accordingly surrounded by the energy accumulator 28, is provided it is then advantageous that the respective radially inner energy accumulator 28a is also supported against radially outward deflections induced by centrifugal force. It is for this reason that the disk-shaped cutouts 56 in the respective chamber 61 of the sliding element 25, 30, 35 are provided in an extension region 98 surrounded by the principle energy accumulators 28 with pins 95, which extend in each instance in direction of the energy accumulators 28, 28a and which are overlapped by coils 29a of the radially inner energy accumulator 28a. In order that the greatest possible radial support in circumferential direction can also be ensured for the radially inner energy accumulators 28a, the pins 95 are each formed with at least one circumferential shoulder 96 and with at least one penetration space 97, namely, in each instance in a predetermined sequence in the axial direction. Of course, the respective penetration space 97 serves in this respect to receive a respective associated circumferential shoulder 96 of a sliding element, which is adjacent in circumferential direction.

Figure 15:
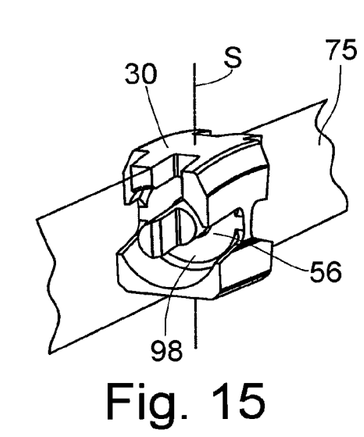
FIG. 15 is a three-dimensional view of a sliding element according to FIG. 13 or 14.
Figure 16:
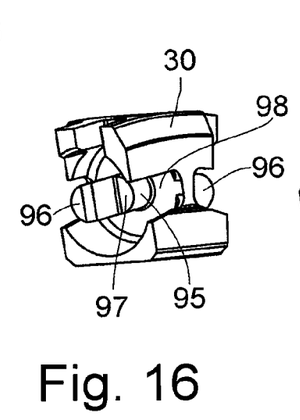
FIG. 16 is the sliding element as in FIG. 15, but seen from a different perspective than FIG. 15.
Figure 17:
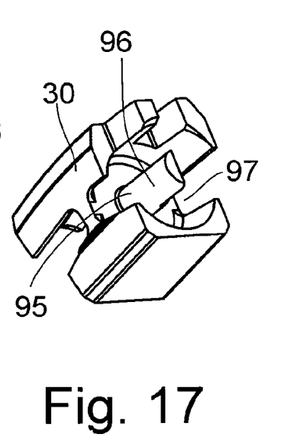
FIG. 17 is the sliding element as in FIG. 16, but seen from yet another perspective.

FIG. 15 shows a sliding element 30 in a three-dimensional view with a pin 95 in which the circumferential shoulder 96 is provided at one side of an axially central virtual plane 75, but the associated penetration space 97 is provided at the opposite side of the axially central plane 75. Of course, as can be seen in FIG. 16, a pin 95 is also provided at the opposite side in circumferential direction, i.e., on the other side of axis S (FIG. 15) with the reverse sequence of circumferential shoulder 96 and penetration space 97 in the axial direction. The pin 95 at the latter circumferential side is shown in FIG. 17.

As is shown in FIG. 13 or 14, the sliding elements 25, 30, 35 with the pin 95 can also be used when only one energy accumulator, namely, the principal energy accumulator 28, is to be provided between two sliding elements adjacent in circumferential direction. Accordingly, these sliding elements 25, 30, 35 can be used universally.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damper comprising:
   a drive-side transmission element (5);
   a damping device (7) comprising a plurality of energy accumulators (28);
   a driven-side transmission element (9) configured to be rotationally deflected coaxial to the drive-side transmission element (5), the driven-side transmission element (9) being connected to the drive-side transmission element (5) via the damping device (7); and
   sliding elements (25, 30, 35) arranged in one of the drive-side transmission element (5) and the driven-side transmission element (9) so as to be movable in a circumferential direction, the sliding elements having:
   (i) circumferential projections (62) for the energy accumulators (28), these circumferential projections (62) being directed toward adjacent sliding elements (25, 30, 35), and/or
   (ii) penetration spaces (66) for the circumferential projections (62) provided at the adjacent sliding element (25, 30, 35),
   wherein the energy accumulators (28) are supported at the sliding elements (25, 30, 35), the sliding elements (25, 30, 35) having in sequence in an axial direction at least one circumferential projection (62) and/or at least one penetration space (66) at the circumferential side facing a sliding element (25, 30, 35) adjacent in the circumferential direction,
   wherein the sequential arrangement of the at least one circumferential projection (62) and of the at least one penetration space (66) at the sliding element (25, 30, 35) in the axial direction is determined by asymmetry with respect to an axially center plane (75), and the sliding elements (25, 30, 35) adjacent in the circumferential direction are provided with at least one circumferential projection (62) and with at least one penetration space (66), but in reverse sequence relative to the first-mentioned sliding element (25, 30, 35),
   wherein the sliding elements (30) that are arranged between every two energy accumulators (28) in the circumferential direction have, in each instance, at least one circumferential projection (62) and at least one penetration space (66) at both circumferential sides (A, B),
   wherein the at least one circumferential projection (62) and the at least one penetration space (66) are provided on a circumferential side (A) of the sliding element (30) in a predetermined sequence in the axial direction of the sliding element (30) and asymmetrically with respect to an axially central plane (75), the at least one circumferential projection (62) and the at least one penetration space (66) being provided on the opposite circumferential side (B) of the sliding element (30) in reverse sequence in axial direction of the sliding element (30) and asymmetrically with respect to an axially central plane (75), and the circumferentially adjacent sliding elements (25, 30, 35) are also provided with at least one circumferential projection (62) and with at least one penetration space (66), but in reverse sequence with respect to the first-mentioned sliding element (30).

2. The torsional vibration damper according to claim 1, wherein each respective circumferential projection (62) narrows axially from its engagement region at a sliding surface (50) of the respective sliding element (30) in the circumferential direction to its circumference-side free end (64), while the respective penetration space (66) narrows axially from its circumference-side penetration region (68) in the circumferential direction to its circumference-side end region (70) adjoining the sliding surface (50) of the respective sliding element (25, 30, 35).

3. The torsional vibration damper according to claim 1, wherein the penetration space (66) is open in a radial direction.

4. The torsional vibration damper according to claim 1, wherein radial space limiting means (84), adapted to provide radial support of the respective associated circumferential projection (62), are associated with the penetration space (66).

5. The torsional vibration damper according to claim 4, wherein first circumferential protuberances (77) and second circumferential protuberances (79) are provided with a radial offset relative to one another radially inward of the radial region of the circumferential projection (62) and penetration space (66), the first circumferential protuberances (77) being associated in each instance with at least one of the circumferential projections (62) and the second circumferential protuberances (79) being associated in each instance with a penetration space (66), and wherein a radial space (80) is provided between the first circumferential protuberances (77) and the respective circumferential projection (62), into which radial space (80) one of the second circumferential protuberances (79) of a circumferentially adjacent sliding element (25, 30, 35) is adapted to penetrate upon approaching.

6. The torsional vibration damper according to claim 4, wherein the second circumferential protuberances (79), adapted to form the radial space limiting means (84) for the respective associated circumferential projection (62), directly adjoin a penetration space (66) from radially inward, while the first circumferential protuberances (77), adapted to form supplementary radial space limiting means (82) for the respective associated second circumferential protuberance (79), move toward the respective second circumferential protuberance (79) from radially inward.

7. The torsional vibration damper according to claim 1, wherein in an extension region (98) surrounded by the energy accumulators (28), the sliding elements (25, 30) have in each instance at least one pin (95), which has at least one circumferential shoulder (96), and at least one penetration space (97) in predetermined sequence with respect to an axially central virtual plane (75), and the sliding elements (25, 30) adjacent in circumferential direction are formed with at least one pin (95), which is provided with at least one circumferential projection (96), and with at least one penetration space (97) but in reverse sequence relative to the at least one pin (95) of the first-mentioned sliding element (25, 30).

8. The torsional vibration damper according to claim 7, wherein when there are radially inner energy accumulators (28a) which are radially surrounded in each instance by the energy accumulators (28), coils (29a) of these radially inner energy accumulators (28a) engage around the respective pin (95).

9. A torsional vibration damper comprising:
a drive-side transmission element (5);
a damping device (7) comprising a plurality of energy accumulators (28);
a driven-side transmission element (9) configured to be rotationally deflected coaxial to the drive-side transmission element (5), the driven-side transmission element (9) being connected to the drive-side transmission element (5) via the damping device (7); and
sliding elements (25, 30, 35) arranged in one of the drive-side transmission element (5) and the driven-side transmission element (9) so as to be movable in a circumferential direction, the sliding elements having:
(i) circumferential projections (62) for the energy accumulators (28), these circumferential projections (62) being directed toward adjacent sliding elements (25, 30, 35), and/or
(ii) penetration spaces (66) for the circumferential projections (62) provided at the adjacent sliding element (25, 30, 35),
wherein the energy accumulators (28) are supported at the sliding elements (25, 30, 35), the sliding elements (25, 30, 35) having in sequence in an axial direction at least one circumferential projection (62) and/or at least one penetration space (66) at the circumferential side facing a sliding element (25, 30, 35) adjacent in the circumferential direction,
wherein the sequential arrangement of the at least one circumferential projection (62) and of the at least one penetration space (66) at the sliding element (25, 30, 35) in the axial direction is determined by asymmetry with respect to an axially center plane (75), and the sliding elements (25, 30, 35) adjacent in the circumferential direction are provided with at least one circumferential projection (62) and with at least one penetration space (66), but in reverse sequence relative to the first-mentioned sliding element (25, 30, 35),
wherein those sliding elements (30) that are arranged between every two energy accumulators (28) in the circumferential direction are formed in an inversely symmetrical manner with respect to an axially central plane (75) so that a sliding element (30) of this kind on a first circumferential side (A) on a first axial side of an axially central plane (75) has a first axial region with at least one circumferential projection (62) or at least one penetration space (66), whereas a second axial region is provided in each instance at the same circumferential side (A) but on a second axial side of the axially central plane (75) as well as on an opposite second circumferential side (B), but on the first axial side of the axially central plane (75), in which second axial region there is associated with every at least one circumferential projection (62) provided in the first axial region in each instance at least one penetration space (66), which is provided at a corresponding location of the respective second axial region, and there is associated with every at least one penetration space (66), provided in the first axial region in each instance at least one circumferential projection (62), which is provided at the comparable location of the respective second axial region, and in that circumferentially adjacent sliding elements (25, 30, 35) are provided with at least one circumferential projection (62) and with at least one penetration space (66), but in reverse sequence with respect to the first-mentioned sliding element (30).

10. A torsional vibration damper comprising:
a drive-side transmission element (5);
a damping device (7) comprising a plurality of energy accumulators (28);
a driven-side transmission element (9) configured to be rotationally deflected coaxial to the drive-side transmission element (5), the driven-side transmission element (9) being connected to the drive-side transmission element (5) via the damping device (7); and
sliding elements (25, 30, 35) arranged in one of the drive-side transmission element (5) and the driven-side transmission element (9) so as to be movable in a circumferential direction, the sliding elements having:
(i) circumferential projections (62) for the energy accumulators (28), these circumferential projections (62) being directed toward adjacent sliding elements (25, 30, 35), and/or
(ii) penetration spaces (66) for the circumferential projections (62) provided at the adjacent sliding element (25, 30, 35),
wherein the energy accumulators (28) are supported at the sliding elements (25, 30, 35), the sliding elements (25, 30, 35) having in sequence in an axial direction at least one circumferential projection (62) and/or at least one penetration space (66) at the circumferential side facing a sliding element (25, 30, 35) adjacent in the circumferential direction,
wherein the sequential arrangement of the at least one circumferential projection (62) and of the at least one penetration space (66) at the sliding element (25, 30, 35) in the axial direction is determined by asymmetry with respect to an axially center plane (75), and the sliding elements (25, 30, 35) adjacent in the circumferential direction are provided with at least one circumferential projection (62) and with at least one penetration space (66), but in reverse sequence relative to the first-mentioned sliding element (25, 30, 35),
wherein the sliding elements (25, 30, 35) are bounded radially inwardly in each instance by a base (55) having second circumferential projections (92) directed to adjacent sliding elements (25, 30, 35) and/or by penetration spaces (94) for the second circumferential projections (92) provided at the adjacent sliding element (25, 30, 35),
wherein on the circumferential side of the sliding elements (25, 30, 35), which faces a circumferentially adjacent sliding element (25, 30, 35), the sliding elements (25, 30, 35) have in sequence in axial direction at least one second circumferential projection (92) and at least one penetration space (94), and the sequential arrangement of the at least one second circumferential projection (92) and of the at least one penetration space (94) at the sliding element (25, 30, 35) in the axial direction is determined by asymmetry with respect to the axially central plane (75), and the circumferentially adjacent sliding elements (25, 30, 35) are provided with at least one circumferential projection (62) and with at least one penetration space (66) but in reverse sequence with respect to the first-mentioned sliding element (25, 30, 35).

11. The torsional vibration damper according to claim 10, wherein those sliding elements (30) arranged between every two energy accumulators (28) in the circumferential direction have in each instance at both circumferential sides (A, B) of their base (55) at least one second circumferential projection (92) and at least one penetration space (94),
   wherein the at least one circumferential projection (92) and the at least one penetration space (94) are provided at a circumferential side (A) of the sliding element (30) in a predetermined sequence in the axial direction of the sliding element (30) and asymmetrically with respect to the axially central plane (75), while the at least one second circumferential projection (92) and the at least one penetration space (94) are provided at the opposite circumferential side (B) of the sliding element (30) in reverse sequence in axial direction of the sliding element (30) and asymmetrically with respect to the axially central plane (75).

12. The torsional vibration damper according to claim 11, wherein the respective sliding element (30) has at its base (55) an inversely symmetrical configuration relative to a sliding surface (50) bounding the sliding element (30) radially outwardly and the base (55) has a penetration space (94) at that location where the sliding surface (50) has a circumferential projection (62) and has at least one second circumferential projection (92) at that location where the sliding surface (50) has a penetration space (66).

\* \* \* \* \*